(12) United States Patent
Davis et al.

(10) Patent No.: US 7,308,082 B2
(45) Date of Patent: Dec. 11, 2007

(54) METHOD TO ENABLE INSTANT COLLABORATION VIA USE OF PERVASIVE MESSAGING

(75) Inventors: Brent L. Davis, Deerfield Beach, FL (US); Peeyush Jaiswal, Boca Raton, FL (US); Pradeep P. Mansey, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 10/626,108

(22) Filed: Jul. 24, 2003

(65) Prior Publication Data

US 2005/0020288 A1   Jan. 27, 2005

(51) Int. Cl.
*H04M 11/06* (2006.01)

(52) U.S. Cl. .............................. 379/88.14; 379/201.01; 704/260; 709/206

(58) Field of Classification Search ............ 379/88.13, 379/88.12, 201.01, 88.14; 704/260; 709/206
See application file for complete search history.

(56) References Cited

U.S. PATENT DOCUMENTS

| | | | |
|---|---|---|---|
| 6,160,995 A * | 12/2000 | Kiswani et al. ......... | 379/88.12 |
| 6,487,533 B2 * | 11/2002 | Hyde-Thomson et al. .. | 704/260 |
| 6,697,474 B1 * | 2/2004 | Hanson et al. ......... | 379/201.01 |
| 2003/0099334 A1 * | 5/2003 | Contractor ............... | 379/88.13 |
| 2003/0135569 A1 * | 7/2003 | Khakoo et al. ............ | 709/206 |
| 2004/0151284 A1 * | 8/2004 | Adamczyk ............... | 379/88.13 |
| 2004/0186889 A1 * | 9/2004 | Washburn ................. | 709/206 |
| 2004/0267531 A1 * | 12/2004 | Whynot et al. ............ | 704/260 |

* cited by examiner

*Primary Examiner*—Gerald Gauthier
(74) *Attorney, Agent, or Firm*—Akerman Senterfitt

(57) ABSTRACT

A system (10) and method (50) to enable instant collaboration via the use of pervasive messaging can include the steps of receiving (52) a call from a caller to a callee, transferring (54) the call to a voicemail system when the callee is unavailable, determining (56) if the callee is available via instant messaging, and querying (58) the caller if they want to leave one among a voice message and an instant message. In another aspect, a system and method (70) enables instant collaboration by receiving (72) a text message having a designation for text-to-speech conversion via an instant messaging network (14) where the text message is intended for a phone (16 or 18) coupled to a voicemail system (20), recognizing (74) the designation, converting (76) the text message to a voice message, calling (78) the phone, and delivering (86) the voice message to the voicemail system.

8 Claims, 4 Drawing Sheets

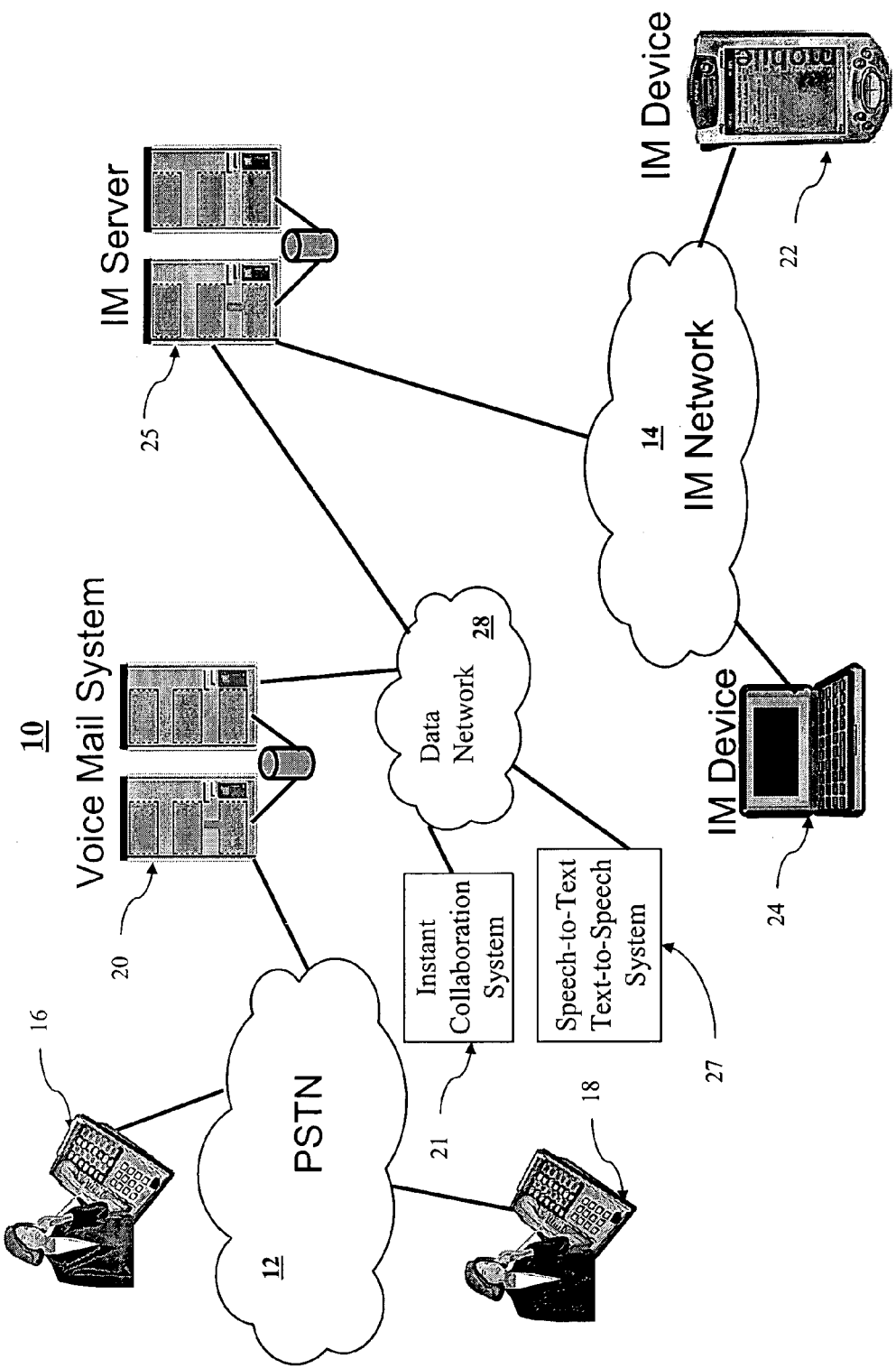

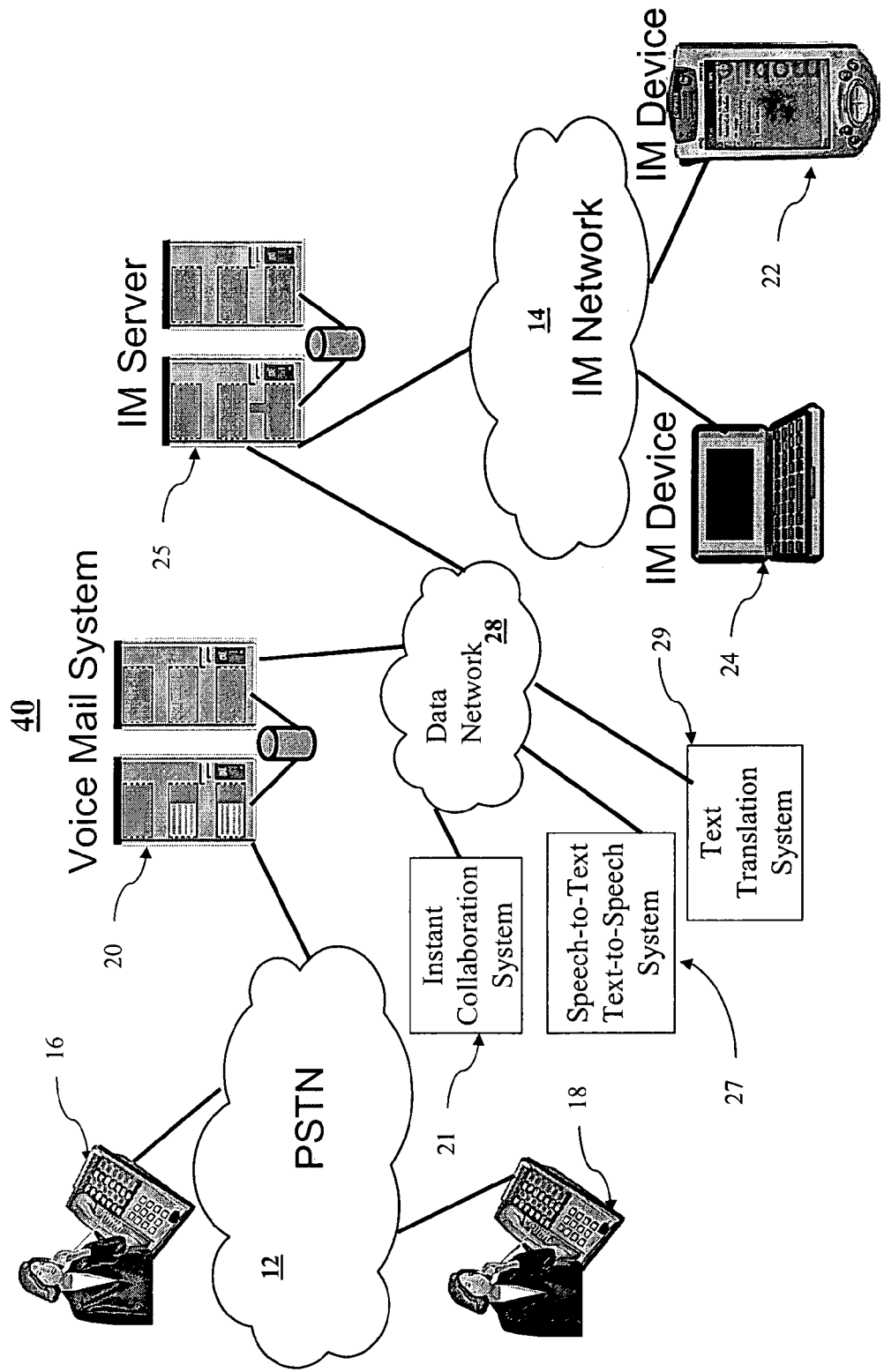

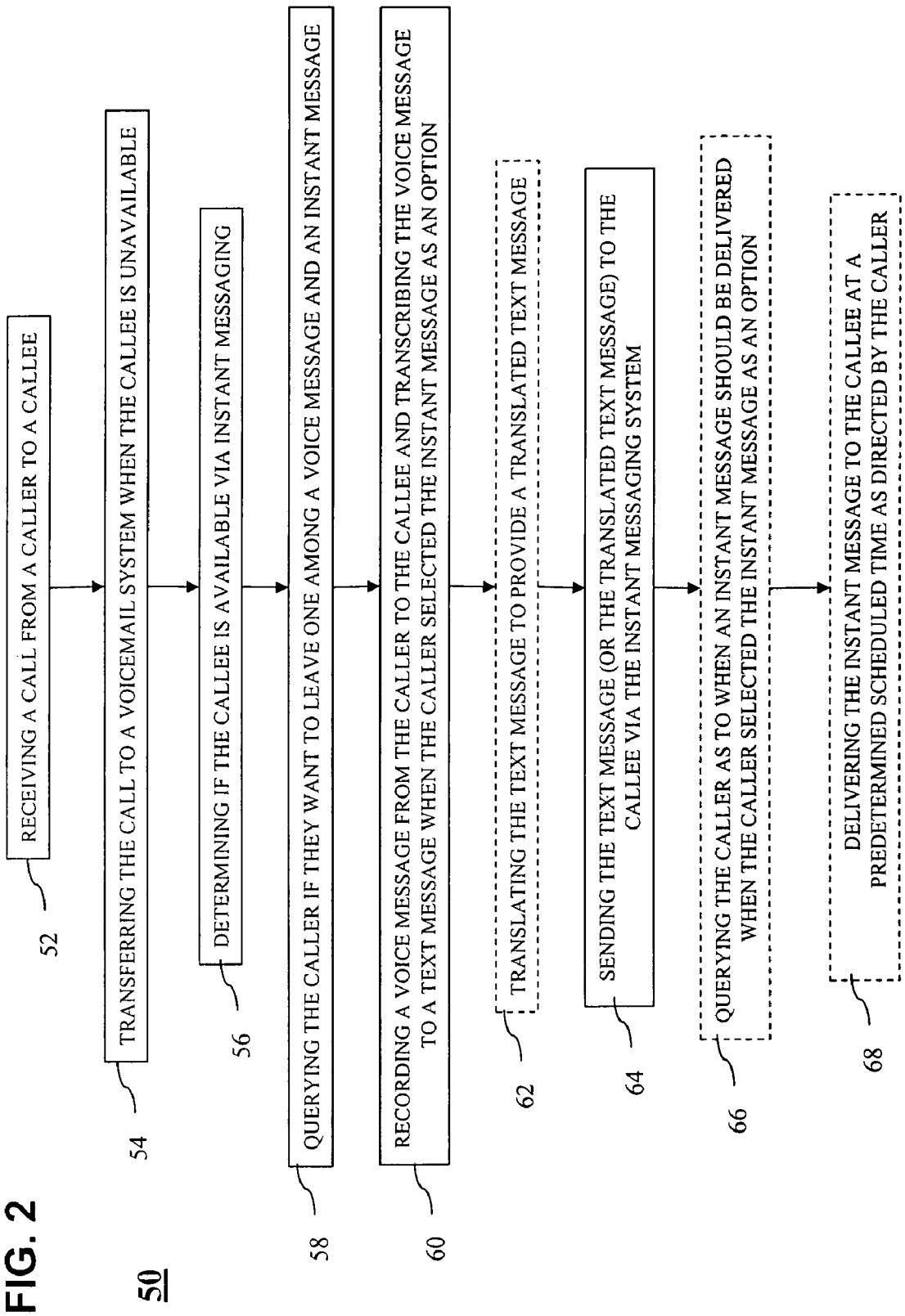

METHOD TO ENABLE INSTANT COLLABORATION VIA USE OF PERVASIVE MESSAGING

BACKGROUND OF THE INVENTION

1. Technical Field

This invention relates to the field of telecommunications and more particularly to a voicemail system using real time messaging as well as text-to-speech and speech-to-text conversions.

2. Description of the Related Art

When using a voicemail system in attempts to reach a particular person over the phone, a caller may never know whether a voicemail message left for the particular person is retrieved. In many instances such as in commercial settings, many workers either fail to retrieve their voicemails when they are in their office or they fail to retrieve their voicemails remotely when they are traveling. More recently, laptop computers and network connected handheld devices are becoming ubiquitous. One of the most used applications in a networked environment is instant messaging (IM). Many people are using IM for collaboration within their enterprise as well as with customers, partners, friends, and family Thus, two communication systems for collaboration exist, yet a unified system fails to exist that fully takes advantage of both systems.

Several systems attempt to bridge the gap between voicemail and instant messaging systems, but such existing systems usually have limitations that prevent a truly user friendly experience in a real-time environment. For example, U.S. Pat. No. 6,430,604 describes a method of delivering instant messages using cell phones and text pagers but using only text entry. Another patent, WO0135615A2, discusses a method of extending an IM system to telephone messaging systems where a user can log into their voice messaging system to communicate with users on their buddy list. European Patent EP0999685A2 appears to describe a system and method for interactive message communication that includes the steps of receiving a marked-up e-mail by an interactive voice response (IVR) system, the marked-up e-mail containing a menu, converting the menu from text to speech, producing a speech menu, reading the speech menu from the IVR system,to a telephone unit, and transmitting a response to the marked-up e-mail based on the speech menu.

Examples of known systems using text-to-speech and speech-to-text include U.S. Patent Publication US2002/0069069 A1, where such system focuses on communications between participants that can and cannot hear voice conversations, or U.S. Pat. No. 6,339,754 B1, where text-to-speech and speech-to-text technologies coupled with language translation enable chat and voice conferencing, or U.S. Pat. Nos. 6,385,586 B1 or 6,292,769 B1, where text-to-speech and speech-to-text technologies are used to improve language translation between two or more spoken (different language) communications.

Although there are numerous systems using text-to-speech and speech-to-text technologies, none are ideally suited for augmenting voice (and text) chat over data transmission protocols, wherein such protocols can include chat/instant messaging (IM) and messaging protocols such as SMS. None of the existing systems provide a method of delivering voice messages to the intended recipient in the native format of the recipient's device in the language understood by the recipient while also providing a real-time collaboration system. Furthermore, none of the systems appear to enable a caller to instantly reach a callee using IM or enable a callee to correspond to such a caller, particular if the caller does not have access to an IM application. Thus, a need exists for a system and method that can overcome the detriments described above.

SUMMARY OF THE INVENTION

Embodiments in accordance with the invention can include a new method and system enabling callers to instantly reach a callee using IM as well as enable users with access to IM applications to correspond with users that don't have access to an IM application.

In a first embodiment in accordance with the invention, a method to enable instant collaboration via the use of pervasive messaging can include the steps of receiving a call from a caller to a callee, transferring the call to a voicemail system when the callee is unavailable, determining if the callee is available via instant messaging, and querying the caller if they want to leave one among a voice message and an instant message.

In a second embodiment in accordance with the invention, a method to enable instant collaboration can include the steps of receiving a text message having a designation for text-to-speech conversion via an instant messaging server where the text message is intended for a phone coupled to a voicemail system, recognizing the designation, converting the text message to a voice message, calling the phone, and delivering the voice message to the voicemail system.

In a third embodiment in accordance with the invention, a system enabling instant collaboration can include a voicemail system, an instant messaging system coupled to the voicemail system, and a processor in the voicemail system. The processor is preferably programmed to receive a call when a callee is unavailable, determine if the callee is available via the instant messaging system, and provide a caller the option among a voice message and an instant message In a fourth embodiment in accordance with the invention, a system enabling instant collaboration can include a voicemail system, an instant messaging system coupled to the voicemail system, and a processor in the voicemail system. The processor is preferably programmed to receive a text message having a designation for text-to-speech conversion via the instant messaging system, wherein the text message is intended for a phone coupled to the voicemail system, recognize the designation, convert the text message to a voice message, call the phone, and deliver the voice message to the voicemail system.

In other aspects of the invention, a computer program having a plurality of code sections executable by a machine for causing the machine to perform certain steps is described. The steps can generally include the steps outlined in the first and second embodiments described above.

BRIEF DESCRIPTION OF THE DRAWINGS

There are shown in the drawings embodiments which are presently preferred, it being understood, however, that the invention is not limited to the precise arrangements and instrumentalities shown.

FIG. 1 is a flow diagram illustrating an exemplary telecommunications system illustrating instant collaboration via pervasive messaging using instant messaging in accordance with the present invention.

FIG. 1A is a flow diagram illustrating an alternative telecommunications system similar to the system of FIG. 1 in accordance with the present invention.

FIG. 2 is a flow chart illustrating a method in accordance with the present invention.

DETAILED DESCRIPTION OF THE INVENTION

Figure 3:
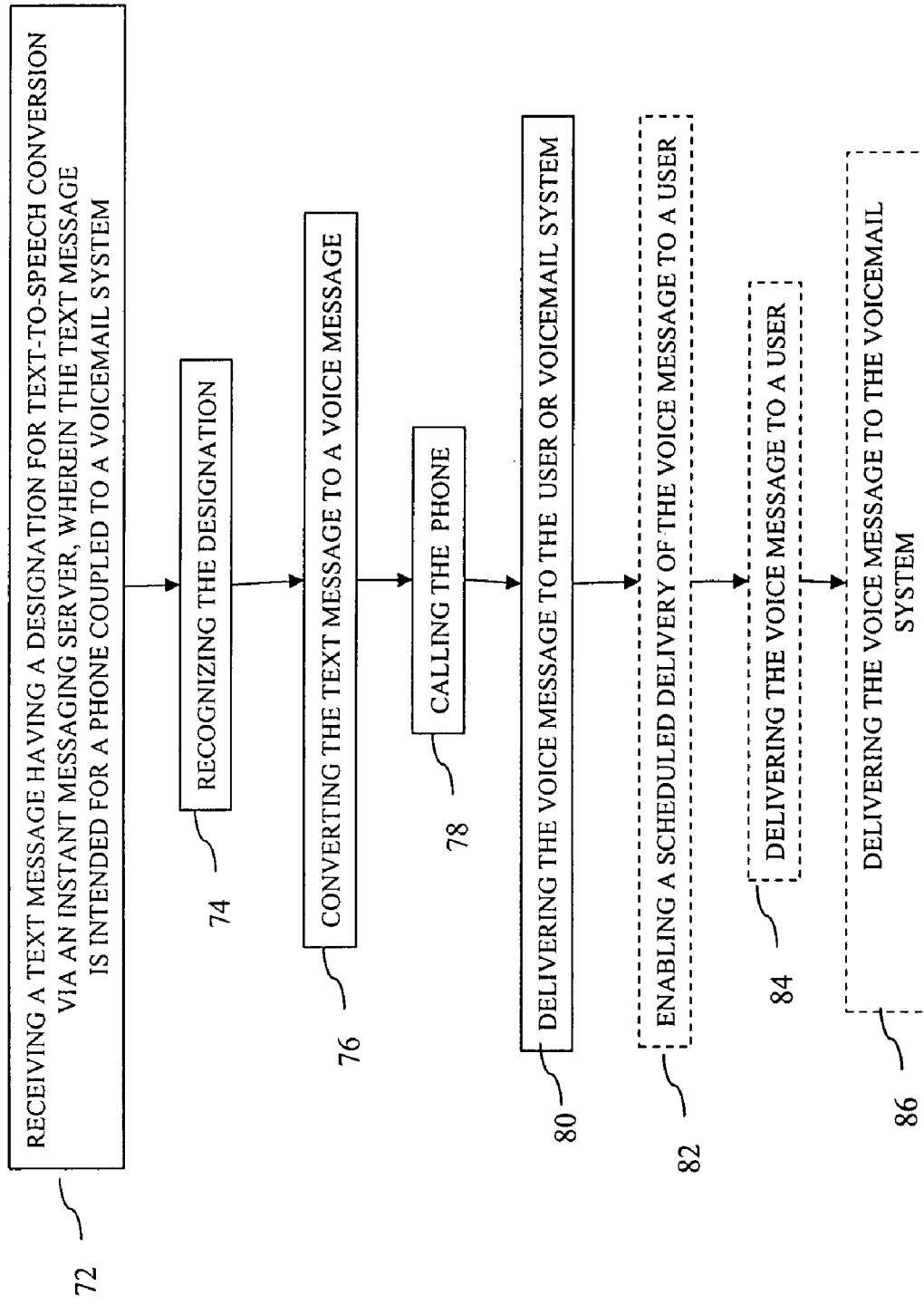
FIG. 3 is a flow chart illustrating another method in accordance with the present invention.

Embodiments in accordance with the invention can provide a solution for enabling telephone users to instantly collaborate using a pervasive messaging system such as an IM-based and voicemail system. In a typical IM network, all participants are connected to an IM server over a communications network and participants can communicate with other parties instantly that are connected to the IM server. In accordance with one embodiment, users can call into a system using their wireline or wireless phone, have the option to leave a conventional voicemail or communicate to a callee via an IM network whereupon the caller records a voice message to the callee. The system transcribes the voice message into text and the text message is then sent via the IM system to the callee.

With reference to FIG. 1, a system 10 for enabling phone users to instantly collaborate can include a communications network 12 such as a PSTN coupled to an IM network 14 via a data network 28 coupled to an IM server 25 for example. One or more phones (16 or 18) such as wireline or wireless phones can be coupled to the network 12 to provide input to and receive input from a voicemail system 20 coupled to the communications network 12 or an IM device 22 or 24 coupled to the IM network 14. The devices 22 or 24 can be personal digital assistants, laptop computers, desktop computers, smartphones or essentially any computing device capable of receiving and displaying text messages. The system 10 further includes a processor 21 or instant collaboration system that is preferably programmed to receive a call when a callee is unavailable, determine if the callee is available via the instant messaging system, and provide a caller the option among a voice message and an instant message. It should be noted that the processor 21 can be in the voicemail system 20, but it can also reside elsewhere in the system apart from the voicemail system as shown but ideally coupled to one of the networks 12, 14, or 28. Optionally, the processor 21 can also be programmed to deliver the instant message to the callee at a predetermined scheduled time as directed by a caller or deliver the message when the callee connects to the IM system.

Referring once again to FIG. 1, the system 10 can alternatively or optionally have a processor 27 or system programmed to receive a text message having a designation for text-to-speech conversion via the instant messaging system (where the text message is intended for a phone coupled to the voicemail system), recognize the designation, convert the text message to a voice message, call the phone, and deliver the voice message to the voicemail system.

A conventional phone (16 or 18) coupled to the voicemail system 20 and IM network 14 can also receive IM messages from other devices in the form of a synthesized speech output. For example, a user inputting text on IM device (22 or 24) would transmit their text message to the phone via the IM network 14 and the communication network 12. The processor 27 can convert the text message to speech and forward or transmit the speech to the phone 16 or 18. Optionally, user profiles (not shown) (with voice prints or other indicia or a particular user) for devices 22 and 24 (and perhaps users of convention phones that have provided some form of identification when entering the IM conference) can enhance the user experience on conventional phones by reconstructing speech having a simulated voice print of the sending party.

Referring to FIG. 1A, another system 40 similar to system 10 of FIG. 1 can include yet another option that would allow for language translation of the text received or converted at a processor 29. Thus, a user profile corresponding to an IM device 22 can direct the processor 29 to translate text received in one language to be transmitted to another device (such as IM device 24 or phones 16 or 18) in another language. Likewise, a phone 16 having a user profile can direct text messages intended for the phone 26 to be translated into another language before speech synthesis so that the user at phone 26 hears speech in a preferred language.

With reference to FIG. 2, a flow chart illustrates a method 50 of enabling instant collaboration via the use of pervasive messaging. Operationally, the system 10 as shown in FIG. 1 would receive a call from a caller to a callee at step 52. At step 54, the call is transferred to a voicemail system when the callee is unavailable. The system can determine if the callee is available at step 56. The method 50 can query the caller if they want to leave at least a voice message or an instant message. The method 50 would then record a voice message from the caller to the callee and transcribe the voice message to a text message at step 60 when the caller selected the instant message option at step 58. Optionally, at step 62, the text message can be translated to another language to provide a translated text message. The text message (or the translated text message) can be transmitted at step 64 to one or more instant messaging devices coupled to an instant messaging network. The first text message can be transmitted as a text stream. As a further option, the caller can be queried at step 66 as to when an instant message should be delivered when the caller selected the instant message as an option. Then, the instant message can be delivered to the callee at a predetermined time as directed by the caller at step 68.

With reference to FIG. 3, another flow chart illustrating a method 70 enabling instant collaboration via the use of pervasive messaging is shown. The method 70 can include the step 72 of receiving a text message having a designation for text-to-speech conversion via an instant messaging server, where the text message is intended for a phone coupled to a voicemail system. At step 74, the method 70 can recognize the designation whereupon the text message can be converted to a voice or speech message at step 76. The method 70 then calls the phone at step 78 and delivers the voice message to the user or the voicemail system at step 80. Optionally, the method 70 enables a scheduled delivery of the voice messages to a user at step 84 or alternatively or additionally to the voicemail system at step 86.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method to enable instant collaboration via the use of pervasive messaging, comprising the steps of:
   receiving a call from a caller to a callee
   transferring the call to a voicemail system when the callee is unavailable;
   determining if the callee is available via one or more instant messaging devices;
   querying the caller if they want to leave one among a voice message and an instant message;
   recording a voice message from the caller to the callee and generating a text message by transcribing the voice message if the caller elects the option of leaving the instant message;
   determining a preferred language for each one of said instant messaging devices, wherein said preferred language is determined according to a user profile corresponding to each one of said instant messaging devices; and
   translating the text message into the preferred language of each of said instant messaging devices having said corresponding user profile specifying a preferred language that is different from a language of the text message.

2. The method of claim 1, wherein the method further comprises querying a caller who elects to leave voice message to determine whether the caller wants to also leave an instant message for the callee, wherein the instant message is delivered at a predetermined scheduled time dictated by the caller.

3. The method of claim 1, wherein the method further comprises the step of sending the text message to at least one of said instant messaging devices.

4. The method of claim 1, wherein the method further comprises the step of querying the caller as to when an instant message should be delivered when the caller selected the instant message as an option.

5. The method of claim 1, wherein the method further comprises the step of delivering the instant message to at least one of said instant messaging devices at a predetermined scheduled time as directed by the caller.

6. A system enabling instant collaboration, comprising:
   a voicemail system;
   an instant messaging system coupled to the voicemail system;
   a processor in the system programmed to:
      receive a call when a callee is unavailable,
      determine if the callee is available via one or more instant messaging devices,
      provide a caller the option among a voice message and an instant message,
      record a voice message from the caller to the callee and generate a text message by transcribing the voice message if the caller elects the option of leaving the instant message,
      determine a preferred language for each one of said instant messaging devices, wherein said preferred language is determined according to a user profile corresponding to each one of said instant messaging devices, and
      translate the text message into the preferred language of each of said instant messaging devices having said corresponding user profile specifying a preferred language that is different from a language of the text message.

7. The system of claim 6, wherein the processor is further programmed to deliver the instant message to at least one of said instant messaging devices at a predetermined scheduled time as directed by a caller.

8. The system of claim 6, wherein the processor resides within the voicemail system.

* * * * *